B. L. ELWELL, W. GRIMM & W. F. DREXLER, Jr.
WIRE FENCE MACHINE.
APPLICATION FILED MAR. 21, 1904.
980,083.
Patented Dec. 27, 1910.
6 SHEETS—SHEET 1.
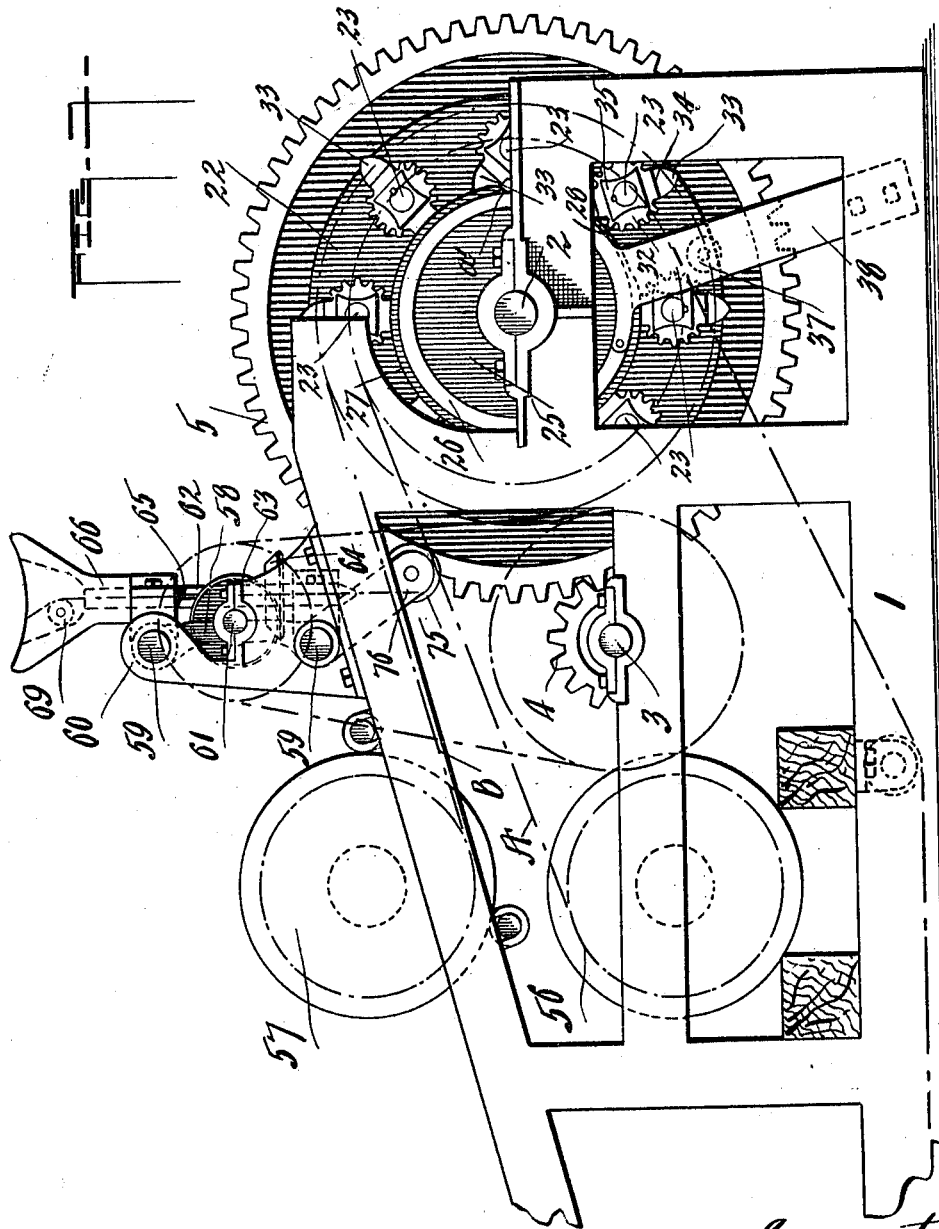
Witnesses:
Robt N. McConnick
Anna C. Ries
Inventors:
Braden L. Elwell,
William Grimm,
William F. Drexler, Jr.
By Chas. N. LaPorte, Atty.

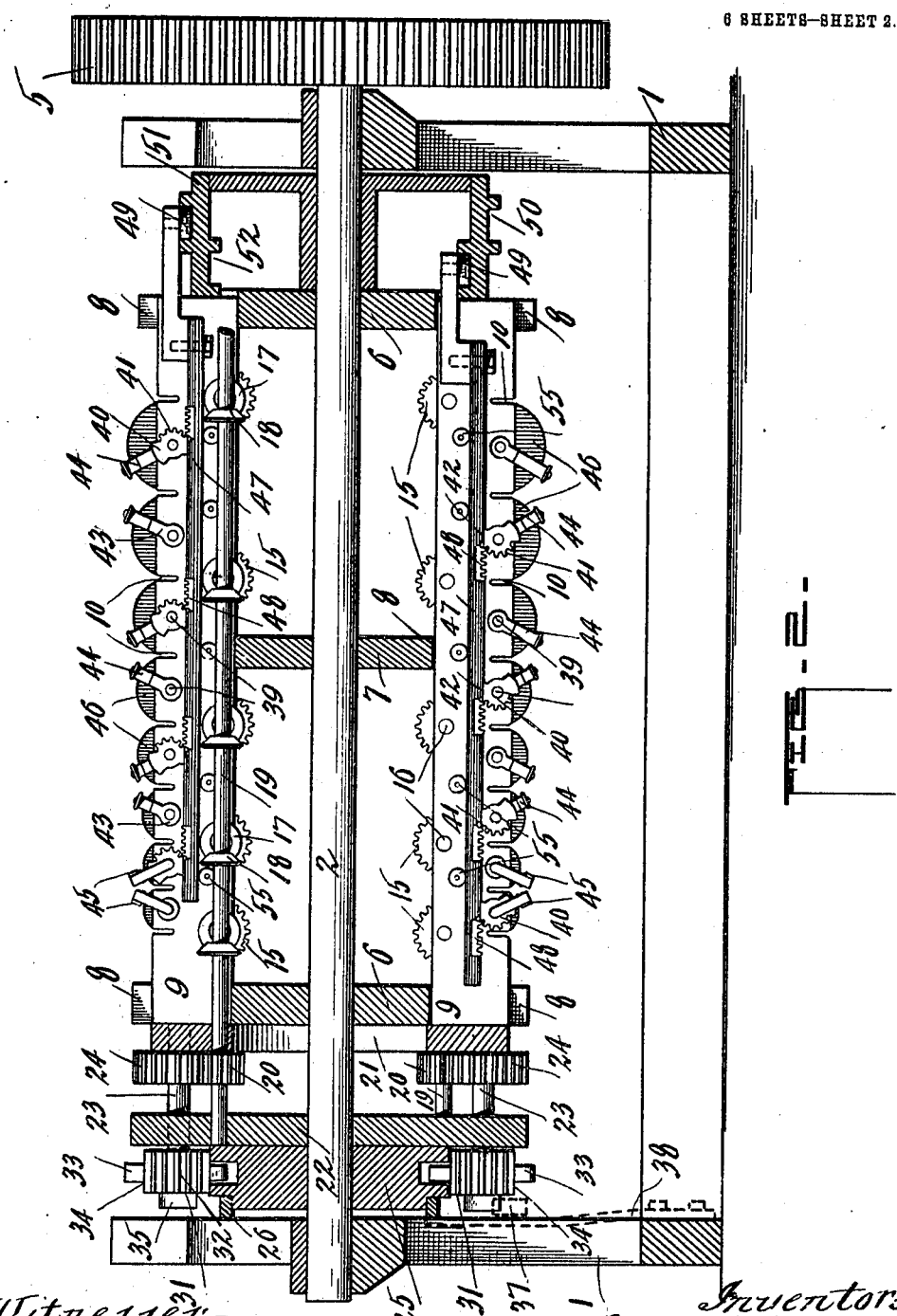

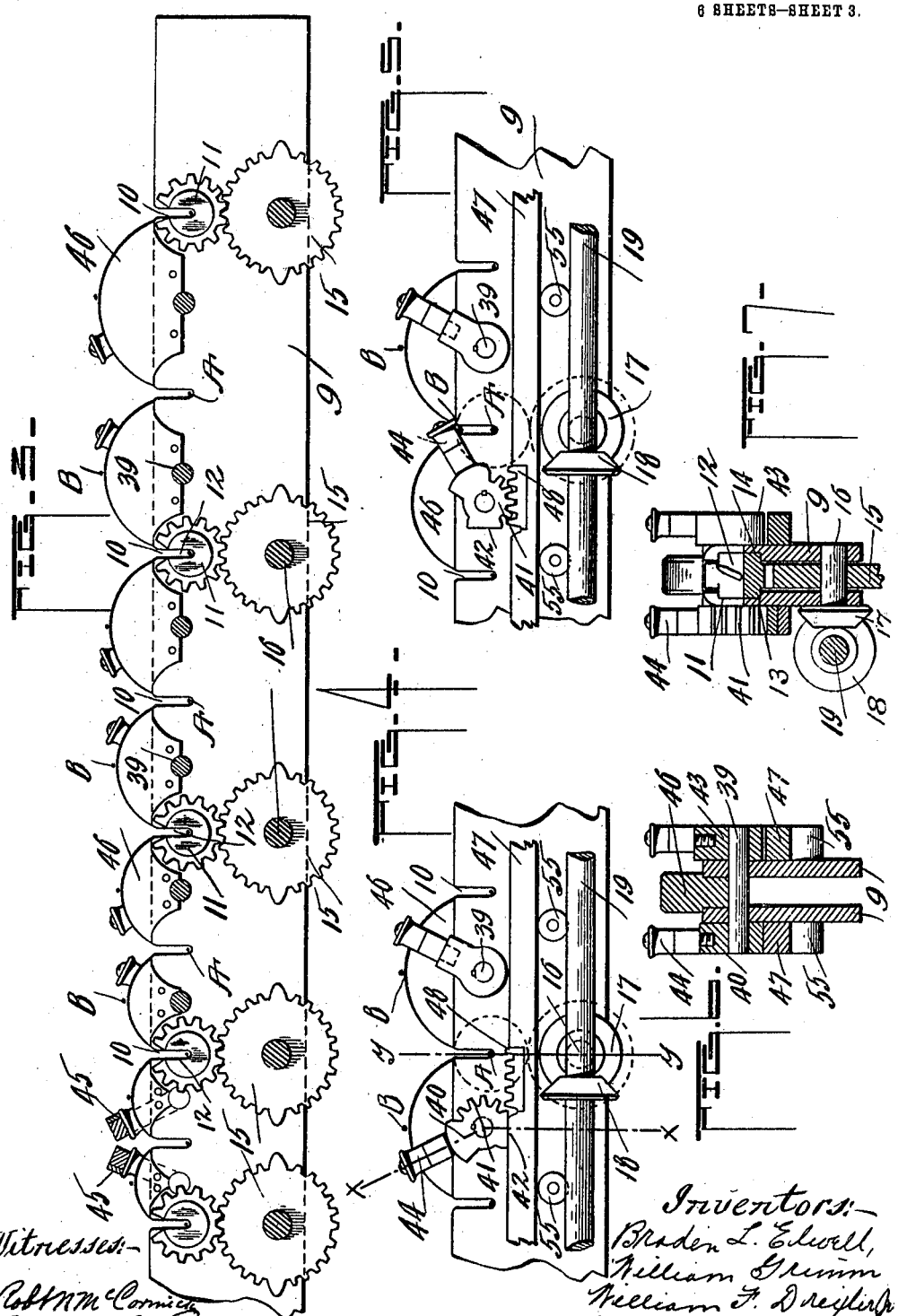

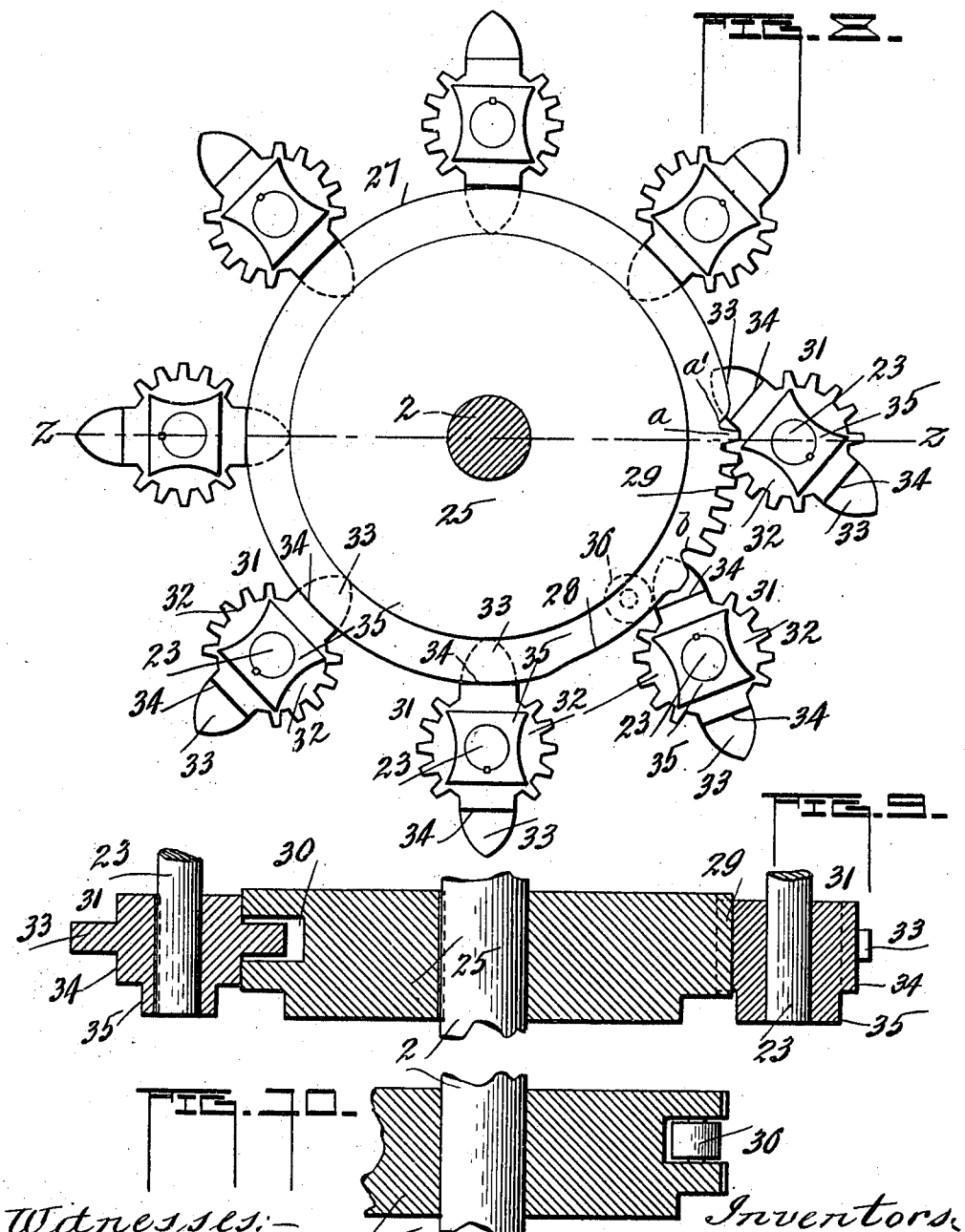

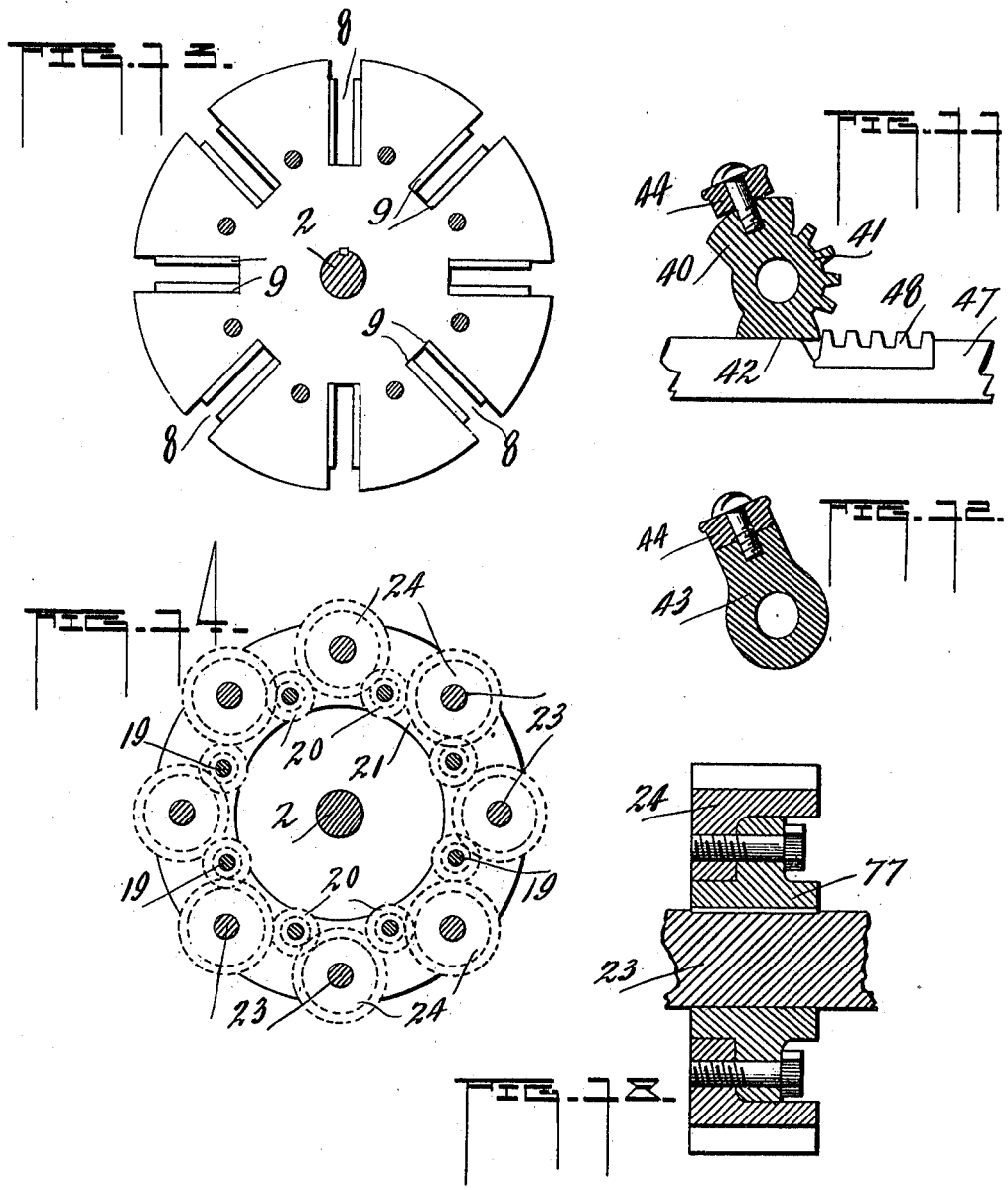

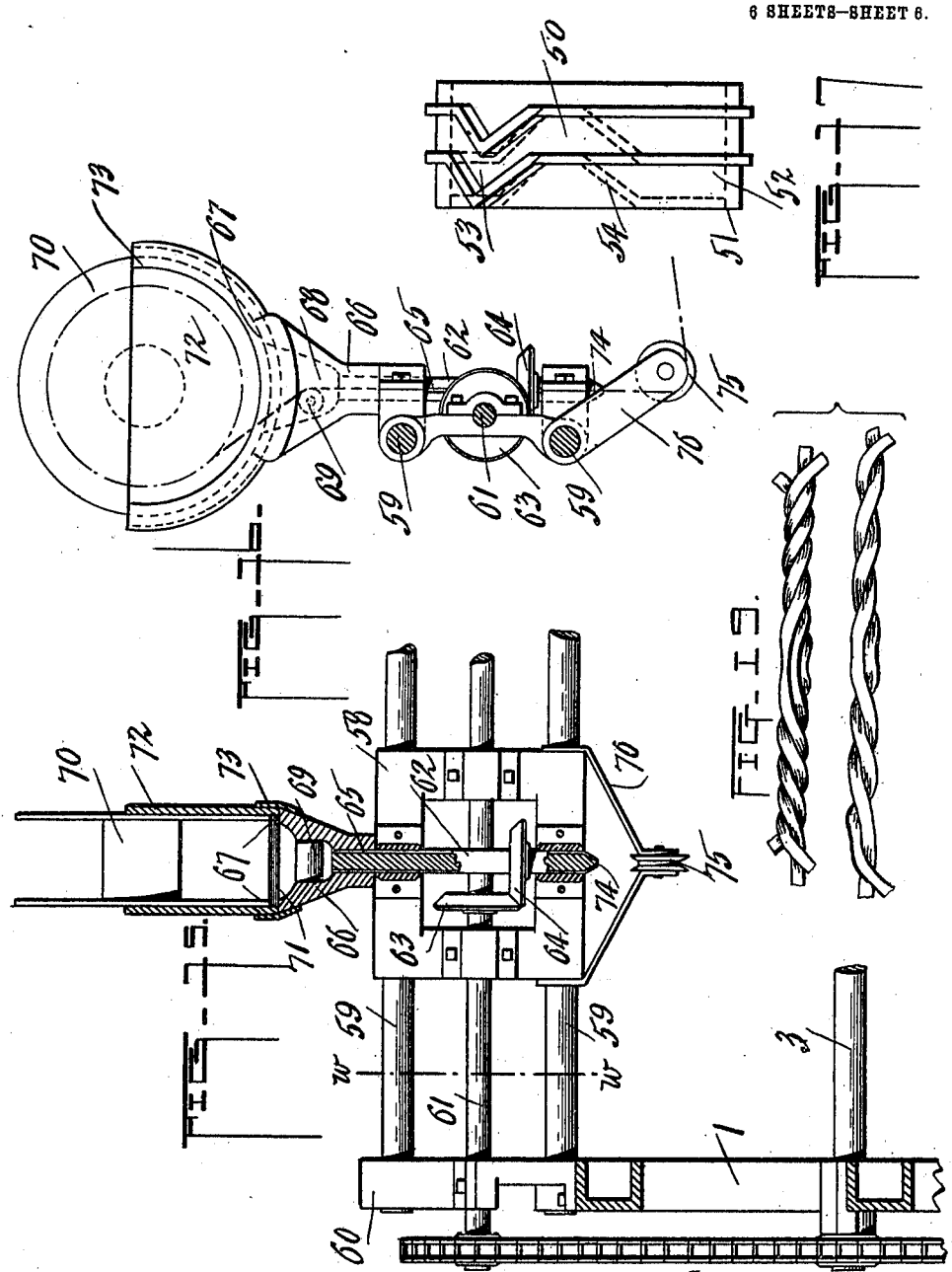

UNITED STATES PATENT OFFICE.

BRADEN L. ELWELL, WILLIAM GRIMM, AND WILLIAM F. DREXLER, JR., OF MORTON, ILLINOIS, ASSIGNORS TO INTERLOCKING FENCE COMPANY, OF MORTON, ILLINOIS, A CORPORATION OF ILLINOIS.

WIRE-FENCE MACHINE.

980,083.    Specification of Letters Patent.    Patented Dec. 27, 1910.

Application filed March 21, 1904. Serial No. 199,129.

*To all whom it may concern:*

Be it known that we, BRADEN L. ELWELL, WILLIAM GRIMM, and WILLIAM F. DREXLER, Jr., citizens of the United States, residing at Morton, in the county of Tazewell and State of Illinois, have invented certain new and useful Improvements in Wire-Fence Machines; and we do hereby declare that the following is a full, clear, and exact description of the invention, which will enable others skilled in the art to which it appertains to make and use the same.

This invention has reference to machines for the manufacture of wire fence.

The object which we have in view is to construct a machine, which when in operation, will continuously weave together wires for forming a fence, which may be made up of body wires extending in the same longitudinal direction and intertwisted or interlocked to form meshes of different contour, or which will produce a fence fabric composed of strand wires and stay wires suitably intertwisted, interlocked or joined at their intersection.

The invention has for its further object to produce a machine comprising a revoluble frame or drum in which is suitably mounted for intermittent rotation a series of twisting devices. The operation of the revoluble frame is such that during a partial rotation thereof, a series of twisting devices will be actuated for the purposes set forth, that of weaving wires into a completed fabric. The twisters are actuated in series and in successive series during the continued rotation of the frame.

The construction of the machine upon which this application is made, is of the type of the machine found in applications for patent bearing Serial Number 100,774 filed Mar. 31, 1902; #121,902 filed Sept. 2, 1902; and #155,438 filed May 2, 1903 owned and controlled by The Interlocking Fence Co., of Morton, Ill., the assignee of the above said applications and who is the assignee of this application.

As above stated, there is no limit to the form of the fabric which it is possible to make upon this machine, but for illustration two fence patents are cited as illustrating two styles of fabric which may be made thereon. They are Patents Number 739,797 and 739,798 dated Sept. 22, 1903 and issued to The Interlocking Fence Co. as the assignee of John L. Claudin.

A further object of the present invention is to construct a revoluble frame or drum in which is mounted for intermittent rotation a series of twisting devices. And further, to mount or support upon said revoluble frame mechanism for primarily shifting strand wires to a series of twisters.

A further object of the invention is to combine with the twisters mounted in a revoluble frame, shifting mechanism adapted to be so actuated that as the frame is revolved, mechanism upon one side of the twisters will convey a wire or wires to said twisters and upon the receding of such shifting mechanism, mechanism upon the opposite side of the said twisters will be simultaneously put in motion and convey a second wire or wires to said twisters and upon the depositing of the last mentioned wires in the twisters, mechanism having a predetermined movement is brought into play for actuating the twisters and simultaneous with such actuation of the twisters, the last mentioned shifting devices are caused to recede.

The invention has for its further object to improve the mechanism for imparting power to the twisters; and further, to provide means in such mechanism for insuring that the twisters will always be in proper alinement to receive the wires fed thereto when the frame has revolved with its twisters to the point where said wires are received by said twisters.

A further object of the invention is to combine with a revoluble frame carrying twisters, a cable feeding and twisting mechanism. Such cable devices are so actuated that they are in motion and producing a cable only during the rotation of the twister carrying frame, and for the purpose of producing a cable as the selvage wire of said fabrics is needed, said cable mechanism being adjustable for the purpose of changing the position of the selvage wire of said fabric. It being desirable to change the width of the fabrics, the machine is so constructed that it is not necessary to at all times feed to all of the twisters, as the machine may be operated for the purpose of making a low fence as well as high fencing and without changing any of the parts of said machine, but to leave off or to add to the number of wires fed thereto. The machine is shown in the drawings as designed for producing a fabric having a graduated mesh, but we do not wish to be limited to the specific form, for the construction is such that the mechanism is applicable for making a fence of either a graduated or uniform mesh throughout.

Further objects and aims of the invention will appear in the following specification, and are illustrated in the accompanying drawings, in which:

Figure 1 is a side elevation of so much of a machine as will illustrate our improvements, certain parts thereof being omitted and other parts shown in dotted lines; Fig. 2 is a longitudinal section through the revoluble frame, showing the twister actuating mechanism and the shifting devices supported thereon and the means for actuating said shifter; Fig. 3 is a somewhat enlarged elevation showing a row of twisters and co-acting parts, also guides for the strand wires and the devices upon the opposite side of the twisters for carrying the wires down into the twisters; Fig. 4 is an enlarged elevation and detail of a pair of shifting members and co-acting parts, and their position just previous to being shifted; Fig. 5 is an elevation in detail of the parts shown in Fig. 4 and with one of the shifting members in the act of carrying a wire into its twister; Fig. 6 is a vertical section on the line X—X of Fig. 4; Fig. 7 is a vertical section on the line Y—Y of Fig. 4; Fig. 8 is an elevation of a cam gear stationarily supported at one side or end of the revoluble frame, and a series of cam pinions which move around the surface of the cam and intermittingly mesh with the teeth thereof for imparting rotation to the twisters with which they are suitably connected; Fig. 9 is a cross section through the cam gear on the line Z—Z; Fig. 10 is a cross section through a portion of the cam gear to show a roller which is adapted to be engaged by the cam pinions as they move around said cam gear; Fig. 11 shows in detail and somewhat enlarged, a shifting member, which is one of a series, and a roller supported thereby; Fig. 12 shows in detail and somewhat enlarged a shifting member which is carried upon the opposite end of a spindle which supports a member such as seen in Fig. 11; Fig. 13 is an elevation of a head or disk forming a part of the revoluble frame and showing supporting means for carrying the twisters; Fig. 14 is an elevation of a ring and in dotted lines showing the arrangement of a series of gears for receiving and transmitting motion from the cam gear and pinions shown in Fig. 8 to the twisters shown in Fig. 3; Fig. 15 is a view in front elevation, partially in section, showing cable twisting devices, the mode of supporting such devices whereby they may be laterally adjusted, and the means for actuating the twisters; Fig. 16 is a side elevation of Fig. 15, but a section through certain shafting appearing on the line W—W; Fig. 17 is a front elevation of a cam employed for the purpose of controlling the movement of and shifting the shifting members; Fig. 18 illustrates in section, the detail construction of certain gears on the machine; Fig. 19 is a detail view showing two different forms of twists which may be made by this machine.

Like numerals of reference indicate corresponding parts throughout the figures.

The machine comprises the frame parts 1 suitably connected and braced, and journaled in such frame parts is seen a shaft 2 extending transversely thereof. The shaft 2, while it is seen to be mounted for horizontal rotation, it is understood that its position may be changed without departing from the objects aimed at herein. There is also journaled in the frame parts 1 a shaft 3, receiving its power from a suitable source and by a suitable means and is adapted to transmit motion to the shaft 2 through a pinion 4 on the shaft 3 and the enlarged gear wheel 5 on the shaft 2.

On the shaft 2 is carried and fixed for rotation therewith, a series of disks or plates 6 and 7 similar to that shown in Fig. 13. They are spaced suitably apart and in this instance are provided with a series of radially arranged slotted portions 8, and adapted to be seated within said slotted portions of the disks and extending from one outside disk to the other, are shown a series of detachable frames or bars 9. These bars are arranged in pairs and when seated in the slotted portions of the disks, are separated a suitable distance apart in a manner and for a purpose to be described.

In each pair of the bars 9 there is seen provided the slots or grooves 10 extending down into the body of the bars a suitable distance and from their outer edges. The slots 10 of each pair of bars are coincident and also coincident with the slots in each succeeding pair of bars which are suitably spaced around the disks 6 and 7. Like in the machines referred to, there is provided a series of twisters, preferably in staggered arrangement, indicated as 11 which are journaled between pairs of the bars 9 and are coincident with each alternate slot 10 thereof. In one pair of bars, the twisters start at the first slot and are located at each alternate slot as in Fig. 3 and in each alternate arranged pair of bars, the twisters are placed beginning with the second slot and at each alternate slot thereafter. This arrangement of twisters will make a fence substantially like that shown in the fence patents referred to above, and like fences; although other and various styles of fences can be and have been made. However, the arrangement of the twisters as herein indicated is one of several forms and we do not wish to be considered as restricting ourselves to this specific arrangement, nor to the supporting of the twisters between the particular forms of bars shown as this arrangement may also be modified. Each twister is provided with a toothed peripheral edge and a slot as at 12 extending down into the body of the twister which is adapted to receive a wire or wires directed therein and into the slots 10 of the bars 9. Each twister is further provided with extended hub portions 13 journaled in depressed portions 14 of the bars 9, see Fig. 7. Meshing with the toothed portions of the twisters, are seen the gear wheels 15 carried by short shafts 16 journaled in the bars 9, and on one end of the shafts 16 and upon the outside of the bars 9 is carried a bevel pinion 17, see Fig. 2. Meshing with the pinions 17 are bevel pinions 18 carried upon longitudinally disposed shafts 19 which extend parallel with and along the bars 9, their outer ends suitably journaled in the disks 6, and at the driving end of the revolving frame are carried out beyond the end thereof and carry the pinions 20 which are driven in the following manner: Supported adjacent to the head end of the revolving frame and in juxtaposition to the disk 6, as seen in Fig. 2, is a ring 21. Separated a short distance from this ring is a disk 22. The disk 22 is supported by the shaft 2 to revolve therewith and the ring 21 is suitably attached to the disk 6. The disk 6 fixed to and rotating with the shaft 2, it will be seen that the ring 21 becomes a part of and rotates with the revolving frame. The shafts 19 extend through the ring 21 and are journaled at their outer ends in the disk 22. Thus it will be seen that the pinions 20 are spaced between the ring 21 and the disk 22. 23 indicates a series of short shafts journaled at their inner ends in the ring 21 and which extend through and beyond the outer face of the disk 22. On each of the shafts 23 is provided a gear which consists of the toothed ring portion 24 adapted to mesh with a pinion 20 on an adjacent bevel gear carrying shaft 19, and the toothed ring portion 24 is suitably secured to a hub portion 77 fixedly connected to the shaft 23. The size of the gears 24 and the pinions 20 are such that the gears and pinions for driving succeeding bevel gear shafts 19 will overlap slightly as seen in Fig. 14. So it has been provided to place one series of gear and pinion adjacent to the ring 21 and each alternate series of gear and pinion adjacent to the disk 22, and thus the reason for spacing the ring and disk apart.

On the shaft 2, at the head end thereof and adjacent to the outer face of the disk 22, is shown a cam gear 25 and such cam gear is adapted to have a fixed relation with reference to the rotation of the revolving frame and this is supported by a ring 26 to which the cam gear is attached and said ring 26 has a fixed connection with the frame part 1, see Fig. 2. The cam gear 25 is provided with a cam face 27 which has an irregular portion at 28 and at 29 is seen a segmental toothed portion. The cam gear is further provided with a substantially circular slot 30 formed in its body and extending down into the same from the face of the cam portion only, see Figs. 8 and 9, the slot or groove 30 being omitted in that portion covered by the segmental toothed portion 29. On the outer end of the short shafts 23, are carried cam pinions 31 having the oppositely disposed segmental toothed portions 32 and the intermediate and elongated cam fingers 33. The cam fingers 33 are of width less than the width of the toothed portions 32 of said cam pinions which provides the shoulder portions 34. And extending laterally from one side of said cam pinions is seen a boss or hub portion 35 serving a purpose to be described.

In the operation of the machine, power being imparted to the shaft 2, will cause the revolving frame and the short shafts 23 to be revolved around the outer face of the cam gear 25. During such rotation, the shoulder portions 34 of the pinions 31 will ride on the cam surface 27 of the cam gear 25, the lower cam finger 33 of the pinions extending down into and moving forward in the slot 30 of the cam gear. As the toothed portion of the pinion 31 approaches the segmental toothed portion 29 of the gear, it will be caused to intermesh therewith and primarily by the shoulder portion 34 of the pinion abutting with the outer face of the first tooth indicated as $a$ in Fig. 8, the cam surface of the cam gear 29 adjacent to the outer face of the tooth being cut a sufficient depth as at $a'$ to admit of the shoulder 34 of the pinion passing over the same as the gear or the toothed portion of the pinion intermeshes in its movement with the toothed portion 29. Such intermeshing of the pinion 31 with the gear 25 will impart a half revolution to the shaft 23 carrying such pinion. A half revolution being imparted to the shaft 23, by means of its gear 24 meshing with the pinion 20 on the shaft 19, the shaft 19 will be caused to make one complete revolution and through the gearing from the shaft 19 to the twisters 11 in the supports 9 the twisters will be caused to make two complete revolutions. During the further movement of the shafts 23 around the cam gear caused by the continued rotation of the revolving frame, the cam finger 33 of the pinion 31 which enters the slot 30 of the cam gear after a half revolution of said pinion, the finger 33 will engage and ride over a roller 36 suitably journaled in the groove 30, see Figs. 8 and 10, one-sixteenth more of a revolution will be imparted to the cam pinion 31 which is for the purpose of causing the twisters 11 to turn a fourth more of a revolution, accomplished through the gearing described, adapted to take the spring out of the wires then being intertwisted or interlocked so that when the twist is removed from the twister, it will not spring but remain in its twisted position. By imparting a one quarter more turn to the twisters, it causes the slots thereof to move past the slots in the bars 9, and it is necessary to provide means for returning the twisters to their positions as shown in Fig. 3 to enable the twisted fabric to be removed therefrom, and to again feed wires thereto. To accomplish this, we have provided a roller 37 supported on a bar 38, the said bar having a fixed connection with the frame 1 and with the ring 26, clearly seen in Fig. 1. The position of the roller 37 with reference to the movement of the cam pinion during the rotation of the revolving frame is such that just as soon as the finger 33 of the pinions passes the roller 36, the cam, hub or boss 35 will engage with the roller 37 and by such engagement will return the shaft 23 to a position sufficiently to cause the gearing between said pinions and the twisters to return the twisters in a position where their slotted portions will coincide with the slotted portions of the bars 9 as in Fig. 3. Such movement will also direct the fingers 33 of the pinions 31 into the groove 30 of the cam gear with the offset 34 riding on the cam surface of the cam gear, as clearly seen in Fig. 8. The surface of the cam gear just below or beyond the toothed portion 29, is depressed as at b to permit the offset 34 of the pinion to have sufficient clearance as it rides on to the cam face of the gear. The depressed portion or irregular surface 28 of the cam gear is to give clearance to the edge of the off-sets 34 of the pinions as the pinions are caused to make one-sixteenth more of a revolution by reason of the engagement of the fingers 33 with the roller 36, which was above fully described and is clearly seen in Fig. 8. Each cam pinion 31 is provided with duplicate parts; that is to say, they have the duplicate toothed portions 32, duplicate cam fingers 33 and also duplicate off-sets 34. This is necessary by reason of the fact that with each revolution of the revolving frame the cam pinions will only make one half a revolution, so in the second revolution of the revolving frame it is necessary to provide that the cam pinions turn again one half a revolution, and so on through each succeeding revolution of the revolving frame.

In forming a fence fabric where the body wires are shifted first to intermesh with adjacent wires on one side and then with the wires upon the opposite side, it is necessary to provide some means which shall be automatic in its operation and have complete control over the wires as they are fed for the purpose of shifting the wires first in one direction and then in an opposite direction. In machines of the character described herein, these shifting devices have been supported upon a frame which is separate from the revolving frame and not upon said revolving frame to rotate therewith. In our machine, we aim to have complete control of all the wires fed thereto and to do not only the twisting during the revolving of said frame but to shift the wires as well. This is accomplished by making the shifting mechanism a part of the revolving frame and providing for the actuation thereof at predetermined periods, during such revolving of the frame. We are aware that in machines of this character, which are referred to in the preamble of this specification, there are provided with shifting devices which are not a part of the revolving frame, wire guides, which assist as the wires are shifted, to insure the wires being delivered into the twisters. But the purpose of these wire guides does not serve the same office as the shifting mechanism hereinafter described, and attention has been called thereto to avoid confusion with our mechanism.

39 indicate a series of short transverse spindles which are journaled in a pair of bars 9, the spindles being located intermediate the wire receiving grooves or slots 10 of the bars 9. On one side of the bars 9 and on the end of each alternate spindle 39, is carried a cam pinion 40 having the toothed portion 41 and the cam portion 42. Upon the opposite end of such spindles and upon the opposite side of the bars 9 to that just described, there is carried a stud 43. The cam pinion 40 and the stud 43 each support a roller 44 in a manner and for a purpose to be described. Upon the opposite side of the bars 9 to that described as being the position for the cam pinions 40 and upon each alternate spindle 39, there is carried also a cam pinion 40 having the toothed portion 41 and the cam face 42; and upon the opposite outer ends of these spindles are also carried studs 43 and attached to said studs and cam pinions are rollers 44, in a manner and for a purpose also to be described. In other words to make the meaning clear, there is provided on each spindle 39 a cam pinion 40 and a stud 43 and on each succeeding spindle 39 across the width of the frame, the cam pinions and studs are alternately arranged and are so disposed, so that only alternate spindles will be actuated by the same mechanism. The spindles 39 are described as being carried transversely through the bars 9, and it is true of all the spindles except the last two spindles which it is impossible to extend through the bars on account of the closeness of the twisters. However, these spindles are only short studded portions which are journaled in the bars 9 and are carried up and their ends connected by a reach 45 overlying the bars, which may be seen in Figs. 2 and 3. The distance between the twisters being graduated as shown in this application, it is necessary to so support the rollers 44 that each succeeding roller beginning where the twisters are close together, shall have a longer sweep. This may be accomplished by making some of the rollers longer or by putting in suitable spacing collars between the cam pinions 40, the studs 43 and the rollers supported thereby.

46 denote a series of plates or blocks, which are supported between each pair of bars 9 and while serving as spacing blocks for holding the bars equidistant to each other are employed as guides over which the wires are carried as they are fed to the twisters. Each plate or block 46 is provided with an upper convex face or surface which is struck on an arc of a circle whose center is the center of the spindles 39; thus said plates or blocks 46 overlie the upper edges of adjacent bars 9 and extend from wire groove to wire groove in said bars. In Figs. 3, 4 and 5, there are shown longitudinally carried strand wires A which are adapted to be fed into the wire grooves or slots 10 and lie adjacent to the bottom of said grooves or slots.

B indicate a series of mesh wires, or what might be termed body wires, which as above described, are intertwisted first with a strand wire upon one side, then shifted and intertwisted with an adjacent strand upon the opposite side. In feeding said body or mesh wires B, they are fed across the surface of the plates or blocks 46 and approximately above the centers of the spindles 39. At a proper time during the rotation of the revolving frame, the cam pinions 40 are actuated for the purpose of carrying the wires B into the slotted portions of the twisters.

The mechanism for actuating the cam pinions 40 consists of the reciprocally carried bars 47, arranged in pairs approximately parallel and upon the opposite sides of the bars 9. In each bar 47, there is provided a short rack 48 adapted to mesh with the toothed portions of the cam pinions 40. In the arrangement of the bars 47, the cam pinions in their normal position will be so disposed that the cam faces 42 thereof will lie adjacent to the upper smooth surfaces of the bars 47 and the cam pinions and studs are disposed at an angle with reference to the vertical bearing of the wire grooves in the bars 9. On the end of each bar 47, there is provided a roller 49 and the rollers of each alternate bar 47 move in a cam-race 50 arranged upon the outer surface of a ring or drum 51 stationarily supported at one end of the revolving frame. And the remaining rollers 49 of the alternate bars 47 move in a cam-race 52 around the inner face of the ring 51. The cam-race 50 has an irregular portion 53 and the cam-race 52 has an irregular face 54. Thus it will be seen that as the twisting-frame or drum is revolved, the bar 47 of each row of twisters, having its roller 49 traveling in the cam-race 50 upon the outer surface of the ring or drum 51, will be shifted forwardly and returned to its normal position, when the bars 47 upon the opposite side of each row of twisters, which have their rollers 49 traveling in the cam-race 52 around the inner face of the said ring 51, will be shifted in a direction just opposite to the movement of the bars 47 just previously described, and returned to their normal position. The irregular faces of the cam-races are so arranged that as a pair of bars 47 upon opposite sides of the twisters coincide with the same, the forward bar will be shifted in advance and started upon its return before the other bar is caused to be shifted. This is necessary because, as will be understood from the drawings, adjacent strand wires B upon the opposite sides of a strand A in a twister must be shifted to such twister to be intertwisted with the strand A carried thereby. In Fig. 5, a view is shown of one of the bars 47 being reciprocated and by such movement, causes a cam pinion 40 and a stud upon the opposite end of its spindle to bring their rollers 44 into engagement with the mesh wire B and carry the same down into the wire groove or slot 10 of the bars 9. As soon as the wire B is deposited, the action of the cam-race is to return the bar 47 and its co-acting parts to their normal position and simultaneously with the rollers 44 of the pinions and studs being raised above the upper edges of the bars 9, the next succeeding bar 47 is caused to be reciprocated which will carry the adjacent mesh wire B down into the wire grooves or slots of the bars 9 and twister for the purpose of causing the same to be intertwisted with the mesh wire B just previously deposited, together with the longitudinal strand wire carried in the twister. The second bar 47 is so timed in its movement that the rollers of its co-acting pinions and studs will prevent any dislodgment of the mesh wires previously deposited, and the construction of the irregular portion 54 of the cam-race which governs the action of this bar 47 is such that the rollers of the cam pinions and studs actuated by the bar referred to will remain momentarily in a stationary position and until the toothed portion of the cam pinions 31 are intermeshing with the toothed segments 29 of the cam gear 25, when the bar 47 will be returned to its normal position. The cam-races as shown in Fig. 17 of the drawing, are a form which we prefer to use to obtain the result above set forth, but we do not wish to be limited or confined to this specific structure or arrangement as shown in said figure. The bars 47 are supported by and move upon the rollers 55 supported upon the outer faces of the bars 9, as clearly seen in the figures. The arrangement of the cam pinions 40 and the studs 43 are such that in their oscillation, their rollers may move down alongside the bars 9 and be returned without interfering therewith. The rollers 44 may be supported or attached to the cam pinions 40 and the studs 43 as shown in Figs. 11 and 12 or in some other suitable way, and may have flanged portions to insure an engagement of the wires B, or otherwise provided for engaging such wires to convey them to the twisters.

The horizontal strand wires A are fed from a series of reels or wire supports 56 arranged and supported somewhat as seen in Fig. 1. The mesh wires B which are fed higher up on the revoluble frame, are unreeled from a series of supports 57 arranged and supported somewhat as seen in Fig. 1, dotted lines being used to represent the wires A, also the wires B and the manner in which the finished fabric is drawn from the machine. Attention is here called to the fact that the intermediate wires A also the selvage wires which are fed through the slots 10 of the bars 9 are not shifted from their original line of feed, and that it is the wires B which are shifted laterally to alternately coincide with the adjacent wires A.

We have referred to a cable forming mechanism. It is to be understood that the cables which are the selvage strands of the fabric, may be fed to the extreme outside twisters of the series for the purpose of making a fabric the width of the entire series of twisters or the cables may be adjusted and fed to any series of twisters as may be desired, for the purpose of varying the width of the fabric without changing any of the operative parts supported on the revoluble frame.

The cable twisting mechanism which is for the selvage wires only comprises a casting or bracket 58 slidably supported upon rods 59, transversely disposed across the machine and to the rear and parallel with the revoluble frame, the ends of the rods 50 supported in brackets 60 which are in turn supported by the frames 1. The shape of the bracket or casting 58 is such that there may be journaled therein and at right angles thereto, the shaft 61 and the twisting spindle 62. The shaft 61 is journaled at its opposite ends in a bearing formed in the brackets 60 supported by the frames 1, and the said shaft 61 is driven by a sprocket and chain connection from the shaft 3. However, this form of drive may be modified. The spindle 62 is driven from the shaft 61 by means of the gear 63 on the shaft 61 and a corresponding gear 64 on the spindle 62. The spindle 62 extends above and below the bracket 58 and is provided with the parallel grooves 65 extending the length of and on opposite faces of said spindle. On the upper end of the spindle 62 is secured for rotation therewith, a member or casting 66 having the concaved upper surfaces 67 and the slotted portion 68 in the body thereof, in which is journaled a roller 69.

70 indicates a spool or reel which is frictionally supported in the member 66 and the peripheral face of the flanges of said spool are designed to rotate upon wooden strips 71 supported on the concave faces 67 of said member. There is also provided an outer casing or shield of wood as at 72 lying in juxtaposition to the outer faces of the spool when the same is in position and said shield 72 is fixedly attached to the member 66 by the metal strip 73, seen in Figs. 15 and 16. It is so adapted that when the spindle 62 which is the twisting member, is rotated, the member 66 and the spool 70 supported thereby will be rotated with said spindle. There are adapted to be wound on the spool 70 two wires, the ends of which are fed down through the member 66, over the roller 69, thence down through the grooves 65 upon the opposite sides of the spindle and merging over a tapered end 74 of the lower end of said spindle, are twisted into a cable and being directed around a sheave wheel 75, the cable is fed to the desired twisters in the revolving frame. The sheave 75 is supported by arms 76 which depend down from opposite sides of the bracket 58 and are carried by the lower rod 59. Thus it will be seen the bracket 58 is so supported that its position may be adjusted on the rods 59; the method of driving the spindle shifter 62 is such that it may also be adjusted to accommodate itself to the adjustment of the bracket. The support of the spool 70 above the twisting spindle, is such that the body of the spool will revolve with the motion of the twister and the wires carried by said spool may be unreeled therefrom and twisted into the form of a cable. Suitable guides, not shown, may be provided between the revoluble frame and the reels supporting the wires for the purpose of guiding the wires A, B and the cable.

Attention is called to the wood casing surrounding the spool 70 on which the wires for forming the cables are carried. Such a casing will deaden the noise incident to the revolving of such cable spools, as they are run very fast, which would not be the case did the spools rotate against a metal base.

Having thus fully described our invention, what we claim and desire to secure by Letters Patent of the United States is:—

1. A machine of the character described, comprising a movable support, wire twisting devices on said support, and wire shifting devices on said support independent of said twisters adapted to shift one or more wires to said twisters.

2. A machine of the character described, comprising a revolving frame, wire twisting devices arranged in rows on said frame, and wire shifting devices carried on said frame and co-acting with each row of twisters to shift one or more wires thereto.

3. A machine of the character described, comprising a shaft, wire twisting devices supported to rotate with said shaft, wire shifting devices also supported by said shaft and adjacent to said twisters for feeding wire strands thereto.

4. A machine of the character described, comprising a movable support, a row of wire twisting devices carried by said support, and wire shifting devices independent of said twisters also carried by said support and arranged upon opposite sides of the twisters.

5. A machine of the character described, comprising a movable support, a series of wire twisting devices on said support, wire shifting devices independent of said twisters carried by said support and upon the opposite sides of said twisters, and means for actuating one series of shifters in advance of the other.

6. A machine of the character described, comprising a revoluble frame, a series of twisters mounted in rows upon said frame and in each succeeding row the twisters are alternately disposed, wire shifting devices mounted on said frame and upon the opposite sides of said twisters, and means for actuating said shifters.

7. A machine of the character described, comprising a movable support, wire twisting devices on said support, oscillatory wire shifting members on said support and adjacent to said twisters, and means reciprocally carried on said support for oscillating said wire shifting members.

8. A machine of the character described, comprising a movable support, a row of wire twisters on said support, a series of oscillatory wire shifting devices arranged in a row on said support and upon opposite sides of said twisters, and reciprocating members adapted to engage and oscillate each alternate shifting device upon one side of said twisters.

9. A machine of the character described, comprising a movable support, wire twisters suitably journaled on said support, means for intermittingly actuating said twisters during the movement of said support, wire shifting members on said support and adjacent to said twisters and means for actuating said shifters in advance of the rotation of said twisters.

10. A machine of the character described, comprising a revoluble support, a row of twisters on said support, wire shifting de- means on said support, reciprocally carried means on said support for actuating said shifters, and devices for intermittingly actuating said reciprocating means.

11. A machine of the character described, comprising a movable support, wire twisting devices on said support, pivotally carried wire shifting devices on said support adjacent to said twisters and having segmental toothed portions, and reciprocally carried bars having segment rack portions for engagement with the toothed portions of the shifters.

12. A machine of the character described, comprising a frame, a row of wire twisters journaled in said frame, wire shifting devices journaled upon opposite sides of said frame adjacent to said twisters and having segmental toothed portions, and a rack bar adapted to intermesh with the toothed portions of the shifters for actuating the same.

13. A machine of the character described, comprising a frame support, a series of twisters journaled in said frame, shifting members journaled on said frame and adjacent to the twisters and comprising members having toothed portions, and a roller supported by said members adapted to engage a wire, and a rack bar adapted to engage the toothed portions of the shifters, for the purposes specified.

14. A machine of the character described, comprising a supporting frame, a series of wire twisters journaled in said frame, wire guides supported in the frame and between the twisters, and pivotally carried wire shifters disposed upon the frame adjacent to said twisters.

15. A machine of the character described, comprising a revoluble frame support, a series of rows of wire twisters on said support, pivotally carried wire shifters disposed on said support adjacent to the twisters, reciprocally arranged members for actuating said shifters, and means supported in a stationary position relative to the rotation of said revoluble frame controlling the movement of said reciprocal members.

16. A machine of the character described, comprising a revoluble frame, a series of wire twisters disposed in longitudinal rows on said frame, wire shifting devices pivotally carried upon opposite sides of each row of twisters, reciprocally carried bars preceding each other for actuating said shifters, a cam stationarily supported at one end of said revoluble frame and connections between the reciprocal bars and the cam, the cam being so disposed that the bars will be caused to reciprocate in advance of each other alternately.

17. A machine of the character described, comprising a revoluble frame, twisting devices on said frame, means for intermittingly actuating said twisters during the continued rotation of the frame, wire shifting members carried upon opposite sides of said twisters, longitudinal bars carried upon the opposite side of the twisters and beneath the members for actuating the same, means for shifting a series of bars in advance of the rotation of the twisters, and means for shifting alternate bars after the first mentioned bars have been shifted and for holding said alternate bars momentarily stationary and until the beginning of the rotation of said twisters.

18. In a machine of the character described, the combination of a support, a twister mounted on said support, a spindle carried through the support adjacent to the twister, and wire shifting devices carried upon the opposite ends of said spindle.

19. In a machine of the character described, the combination of a support, a twister on said support, a spindle journaled in the support, shifting members on the opposite end of said spindle, one member having a cam face and a toothed segment, and means adapted to engage said toothed segment of the member for actuating the shifters and provided with means for engaging the cam face of said member for retaining it in its normal position stationary.

20. In a machine of the character described, the combination of a support, a twister journaled on said support, a spindle carried through the support adjacent to the twister, wire shifting members carried on the ends of said spindle, means for actuating said shifters, and stationary wire guides attached to the support and between the shifting members on the spindle.

21. A machine of the character described, comprising a revoluble frame, a series of wire twisters mounted for intermittent rotation in said frame, a cam gear fixed relative to the rotation of said frame and a groove extending down into the body of the cam gear and partially encircling the same, cam pinions adapted to actuate the twisters by contact with said cam gear during a partial rotation of the frame, the cam portions of the pinions moving in the groove of said cam gear, and means disposed in said groove at a point just beyond the gear of said cam, for the purpose of engaging the cams of the pinions to impart an additional partial rotation to said pinions, for the purposes specified.

22. A machine of the character described, comprising a revoluble frame, a series of wire twisters mounted for intermittent rotation in said frame, a segmental gear having a cam surface and fixed relative to the movement of the rotating frame, segmental pinions having cam fingers, adapted to be actuated by engagement with the gear of the cam and in turn impart rotation in a suitable manner to the twisters, said cam gear being provided with an approximately annular groove in its body, means carried in said groove adapted to engage the fingers of the pinions to impart an additional partial rotation to said pinions, off-sets on the body of said pinions adapted to ride on the surface of the cam of said gear, and means for righting the position of the cam pinions and causing the off-sets of said pinions to be directed onto the surface of the cam of said gear.

23. A machine of the character described, comprising a revoluble frame, a series of twisters mounted in said frame, a cam gear fixed relative to the movement of said frame, pinions adapted to ride on the surface of the cam and to have a one half revolution imparted to them during a partial rotation of the frame when meshing with the gear of said cam, and gearing disposed between the pinions and twisters for imparting two complete revolutions to said twisters during the meshing of said pinions with the gear of the cam, substantially for the purposes specified.

24. A machine of the character described, comprising a revoluble frame, a series of twisters mounted in said frame, gearing fixed relative to the movement of said frame, cam pinions adapted to intermittingly mesh with said gear to have imparted to them a one-half revolution, gearing disposed between the pinions and twisters for imparting two complete revolutions to said twisters, means engaging said cam pinions for imparting an additional partial rotation thereto, which in turn imparts an additional partial rotation to the twisters through the gearing specified, and means adapted, during the continued rotation of the frame, to return the pinions an additional partial rotation which will in turn partially reverse and return the twisters to their normal position.

25. In a wire fence machine, the combination with a series of wire twisters, of the cam gear 25, having the segmental toothed portion 29, and the approximately annular groove 30, in the body of said cam gear, the pinions 31 having segmental toothed portions 32 for engagement with the toothed portion of the cam gear, the cam fingers 33 adapted to move in the groove of said cam gear, and the off-sets 34 adapted to ride on the cam face of the cam gear 25, substantially for the purposes set forth.

26. In a machine of the character described, the combination with a series of wire twisters, of the cam gear 25 having a segmental toothed portion 29 and the approximately annular groove 30 in the body thereof, the pinions 31 provided with oppositely disposed segmental toothed portions and the oppositely disposed cam fingers, the toothed portions adapted to intermittingly and alternately engage with the toothed portion of the cam gear and the cam fingers adapted to move in the groove of said cam gear, off-set faces of said pinions adapted to ride on the cam face of said gear, means on the cam gear for engaging the fingers of the pinions and thereby impart an additional partial rotation to said pinions after one of its toothed portions has emerged from the toothed portions of the cam gear, and means adapted to engage with the pinions in their movement for returning them to a position to cause the off-set faces thereof to abut with and ride upon the cam face of said cam gear.

27. In a machine of the character described, the combination of a disk provided with a cam face and with a segmental toothed portion and having a groove extending approximately around its circumference, a moving body, a series of pinions supported on said body and adapted to travel around said disk, said pinions being provided with toothed segments adapted to intermesh with the segmental toothed portion of the disk when co-incident therewith, fingers of said pinions adapted to move in the groove of the disk and abutting faces of the pinions and cam face of the disk when they are co-incident.

28. A machine of the character described, comprising a revoluble frame, wire twisters on said frame, means for feeding strand wires to said twisters, cable twisting devices, and means for forming and feeding cable strands to certain twisters of the series during the continuous rotation of said frame.

29. A machine of the character described, comprising a revoluble support, wire twisting devices disposed in longitudinal series on said support, means for feeding strand wires to the twisters, cable twisting devices supported at the rear of the revoluble support and so actuated as to form and deliver a cable strand to said revoluble frame only during its continued rotation.

30. A machine of the character described, comprising a movable support, wire twisting devices on said support, and cable strand forming and feeding mechanism supported at the rear of said movable support.

31. A machine of the character described, comprising a revoluble support, a series of wire twisting devices disposed in a row on said support, and adjustably carried cable strand forming and feeding devices supported and adjustable longitudinally at the rear of said revoluble support.

32. A machine of the character described, comprising a revoluble support, a series of rows of wire twisting devices on said support, a frame longitudinally adjustable at the rear of said support, and cable forming and feeding mechanism suitably supported in said adjustable frame.

33. A machine of the character described, comprising a revoluble support, twisting devices suitably arranged on said support, a frame supported at the rear of said twister support, a cable twisting member journaled in said frame, a spool connected with said cable twisting member and adapted to feed wires to said twisters for forming a cable, and means for guiding the completed cable strand to a series of twisters in the revoluble support.

34. A machine of the character described, comprising a revoluble frame, a series of twisters suitably mounted in said frame, strand wire feeding mechanism, a stationary support at the rear of the revoluble frame, cable forming mechanism, carried on said stationary support, means for feeding the cable as it is formed to twisters in said revoluble frame, and gearing for actuating said cable forming mechanism.

35. Cable forming mechanism comprising a support, a twisting spindle, journaled in said support, a transversely carried driving shaft, gearing between the driving shaft and spindle, a member revolubly supported on one end of the spindle, a spool rotatably carried in said member, and means for guiding wires unreeled from said spool to and down upon opposite sides of said cable forming spindle.

36. Cable forming mechanism, comprising a pair of frame supports, a bracket slidably supported on said frames, a cable twisting spindle, journaled in the bracket, a spool carrying member rotatably supported on one end of said cable forming spindle, and gearing for actuating said spindle.

37. Cable forming mechanism, comprising a frame, a cable forming spindle journaled in the frame, a spool carrying member attached to the end of the spindle, a spool, and a wood casing attached to said spool carrying member in which the spool is carried, and means for actuating said cable forming spindle.

38. A machine of the character described, comprising a base, a shaft revolubly carried in said base, wire twisters, and means for supporting said twisters from and to rotate with said shaft, a driving shaft and gearing between said driving shaft and twister supporting shaft, means for feeding strand wires to said twisters, cable forming mechanism supported on said stationary frame and adapted to form and feed cable selvage strands to the twisters, supported and rotating with said twister carrying shaft, and driving connections between said power shaft and said cable forming mechanism.

39. A machine of the character described, comprising a revoluble support, twisting devices on said support, means for intermittingly actuating the twisters during the continued rotation of the support, means for feeding strand wires to the twisters, means for feeding mesh wires to be intertwisted with the strand wires in the twisters, and cable forming and feeding mechanism so disposed and actuated as to feed cable selvage strands during the continued rotation of said revoluble support.

40. A machine of the character described, comprising a revoluble support, twisting devices on said support, means for intermittingly actuating the twisters during the continued rotation of the support, means for feeding strand wires to the twisters, means for feeding mesh wires to said revoluble frame, shifting devices on said revoluble frame for shifting the mesh wires to coincide with the strand wires in the twisters, and cable forming and feeding mechanism so disposed and actuated as to feed cable selvage strands during the continued rotation of said revoluble support.

41. A machine of the character described, comprising a revoluble support, a series of wire twisters journaled in said support to rotate in a direction opposite to the rotation of said support, mechanism arranged in the support and beneath the twisters for actuating said twisters, strand wires being fed to said twisters in line with the axis of said twisters, and cable forming and feeding mechanism arranged at the rear of said revoluble support and adapted to have said completed cables fed to the twisters in line with the axis of their rotation.

42. A machine of the character described, comprising a revoluble support, a series of wire twisting devices journaled in longitudinal line on said support, mechanism disposed between the twisters and coacting therewith, for the purpose of intermittingly actuating said twisters, strand wire feeding mechanism, and cable selvage strand forming and feeding devices, adapted to be actuated for forming and feeding cable strands during the rotation of the revoluble support.

43. Cable forming mechanism, comprising a spool adapted to carry two coils of wire, a support for the spool, means for rotating such support, means for drawing from said spool the wires thereon in unison, and means for intertwisting the said wires to form a cable.

44. Cable forming mechanism, comprising a grooved spindle, a spool adapted to carry two coils of wire, supported on said spindle, means for rotating the spindle and spool carried thereby, and means for drawing the two wires on the spool in unison therefrom and down through the grooves of the spindle, simultaneously with the rotating of said spindle.

45. In a machine of the character described, the combination with a plurality of wire connecting devices in staggered arrangement, a series of oscillating shifting members associated with said twisters, and reciprocally supported means for actuating the said shifting members.

46. In a machine of the character described, the combination with several sets of twisters mounted to travel in unison, the twisters of adjacent sets having alternate arrangement, and a series of pivotally supported wire guiding devices associated with said twisters and adapted to travel therewith.

47. In a machine of the character described, the combination with a series of spaced sets of twisters, the twisters of adjacent sets being in alternate arrangement, of a series of pivotally supported wire guiding and deflecting devices associated with said twisters, the said wire guiding devices being disposed alternately with said twisters.

48. In a machine of the character described, the combination with a series of wire connecting devices movable in an endless orbit and having staggered arrangement, of a series of pairs of pivotally supported wire guiding means associated with said twisters.

49. In a machine of the character described, the combination with means for advancing a plurality of wires, of several sets of wire connecting devices mounted to travel in unison in an endless orbit, the devices of adjacent sets having alternate arrangement, means for operating said devices to connect the wires in transit, and a series of pairs of pivoted wire shifters associated with said twisters and adapted to travel therewith.

50. In a machine of the character described, the combination with a rotary drum, of a series of wire connecting devices carried by the drum in staggered arrangement, and a series of pivotally supported wire shifters associated with the twisters and carried on said drum.

51. In a machine of the character described, the combination with a rotary drum, of a series of staggered twisters distributed around the drum, means for operating the twisters during the movement of the drum, a series of pivotally supported wire shifters associated with the twisters, and carried by said drum, and means for oscillating said shifters during the movement of the drum.

52. In a machine of the character described, the combination with means for advancing a plurality of wires, of a rotary drum, several sets of twisters distributed about the drum, the twisters of adjacent sets having alternate arrangement, a series of pairs of pivotally carried wire shifting devices on said drum and associated with each of said sets of twisters thereof, means for operating the twisters during the movement of the drum to effect the connection of the wires in transit, and means for actuating the shifting devices just previous to the movement of the twisters.

53. In a machine of the character described, the combination with a rotary drum, of a series of twisters distributed around the drum and mounted to travel therewith, a series of pivotally supported wire shifting members mounted on said drum adjacent to said twisters, and means independent of each other for inaugurating the movement of the twisters and the shifting members at the same point in their travel.

54. In a loom adapted to produce wire fabric from a plurality of continuously moving wires fed longitudinally in the same general direction, a support, mechanism carried by the support and movable with the wires in the direction of the feed thereof to connect said wires at intervals, and means on said support adjacent to said connecting mechanism adapted to shift said wires slightly in advance of the actuation of such mechanism.

55. In a loom adapted to produce wire fabric from a plurality of continuously moving wires fed longitudinally in the same general direction, a row of twisters disposed transversely of the wires and movable in unison in the direction of the feed thereof, wire shifting devices supported adjacent to the twisters, and movable in unison with said twisters, means for actuating the shifting devices at predetermined intervals, and means for operating the twisters during their movement with the wires to twist said wires together.

56. In a wire fence machine, a revoluble drum, twisters mounted in rows around the drum and also longitudinally of the drum, wire flexing means mounted in longitudinal rows on said drum, and means for actuating the longitudinal rows of twisters in succession as the drum is revolved.

57. In a wire fence machine, a revoluble drum, twisters mounted on the drum and in rows around the drum and also longitudinally of the drum, wire flexing means mounted in longitudinal rows on said drum, means for actuating the longitudinal rows of twisters in succession as the drum is revolved, and means for actuating the longitudinal rows of flexing means in succession as the drum is revolved.

58. In a wire fabric machine, a revoluble drum, twisters mounted in longitudinal rows on the drum, wire flexing means associated with said twisters mounted on the drum and also in longitudinal rows thereon, and means for actuating the rows of twisters one at a time in succession.

59. In a wire fabric machine, a revoluble drum, a series of rows of twisters revolubly mounted on said drum, gears in mesh with each of said twisters, wire flexing means associated with said twisters and mounted on said drum, and means for actuating said flexing means.

60. In a wire fabric machine, a revoluble drum, a series of rows of twisters revolubly mounted on said drum, gears in mesh with each of said twisters, wire flexing means associated with said twisters and mounted on said drum, and reciprocally supported devices for operating the said flexing means.

61. In a wire fabric machine, a revoluble drum, a series of rows of twisters revolubly mounted on said drum, gears in mesh with each of said twisters, a series of pivotally supported wire flexing devices associated with said twisters and mounted on said drum, and means for operating said flexing devices.

62. In a wire fabric machine, a revoluble drum, a series of rows of twisters revolubly mounted on said drum, gears in mesh with each of said twisters, a series of pivotally supported wire flexing devices associated with said twisters and mounted on said drum, and longitudinally movable mechanism for operating said wire flexing devices.

63. In a wire fabric machine, a revoluble support, a series of twisters mounted in a longitudinal row on said support, means for operating said twisters, a series of wire flexing devices mounted on said support, and a rack-bar in mesh with said flexing devices.

64. In a wire fabric machine, a revoluble drum having at intervals longitudinally movable rack-bars, pivotally supported wire flexing devices in mesh with said rack-bars, and means for actuating said rack-bars in succession as the drum is revolved.

65. In a wire fabric machine, a revoluble drum having at intervals longitudinally movable bars, a series of rack-bar sections attached at intervals to said bars, a series of pivotally supported wire flexing devices disposed at intervals on said drum coinciding and in mesh with the rack-bar sections aforesaid, and means for actuating the bars in succession as the drum is revolved.

66. In a wire fabric machine, a revoluble drum having at intervals gears mounted in rows around the drum and also longitudinally of the drum, slotted twister wheels in mesh with said gears, means for successively operating the rows of gears, wire flexing means associated with said twisters and mounted on said drum, and mechanism for actuating said flexing means.

67. In a wire fabric machine, a revoluble drum having at intervals mounted in rows around the drum and also longitudinally of the drum, slotted twister wheels in mesh with said gears, means for successively operating the rows of gears, wire flexing devices mounted in longitudinal rows on said drum in proximity to said twisters, and reciprocally supported means for actuating said flexing devices.

68. In a wire fabric machine, a revoluble drum having at intervals longitudinally disposed shafts, gears mounted in longitudinal rows on said drum, driving connections between the shafts and said gears, slotted twister wheels in mesh with said gears, means for operating the adjacent shafts in succession, wire flexing devices revoluble with said drum, and means operating at predetermined intervals for actuating said flexing devices.

69. In a wire fabric machine, a support, a row of twisters mounted on said support, wire flexing devices mounted on said support intermediate the twisters, means for actuating the twisters, and means for actuating the flexing devices.

70. In a wire fabric machine, a support, a row of twisters mounted on said support, gears in mesh with said twisters, means for actuating said gears, wire flexing devices mounted on said support intermediate the twisters, and means for actuating said flexing devices.

71. In a wire fabric machine, a support comprising a pair of slotted frames, twisters journaled in said frames and coinciding with the slots thereof, wire flexing devices mounted on opposite sides of said frames intermediate the slots thereof, means for actuating the twisters, and means for operating the flexing devices.

72. In a wire fabric machine, a support, a row of twisters mounted on said support, means for actuating the twisters in said row simultaneously, a row of wire flexing devices pivoted to said support intermediate the twisters thereof, and means for oscillating said wire flexing devices.

73. In a wire fabric machine, a support, a row of twisters mounted on said support, wire flexing devices pivotally connected to said support, means for oscillating said flexing devices, wire guides associated with said flexing devices, and means for actuating said twisters.

74. In a wire fabric machine, a support, a row of twisters mounted on said support, wire flexing devices movably attached to said support and intermediate the twisters thereon, means reciprocally carried on said support for actuating said flexing devices, wire guides associated with said flexing devices, and means for actuating said twisters.

75. In a wire fabric machine, a support comprising a pair of parallel frames, blocks separating said frames and serving as wire guides, a series of twisters revolubly mounted between said frames, wire flexing devices carried by said frames, means for actuating said twisters, and means for actuating the flexing devices.

76. In a wire fabric machine, a support comprising a pair of parallel frames, blocks separating said frames and serving as wire guides, a series of twisters mounted between said frames, a series of gears in mesh with said twisters, means for operating said gears, wire flexing devices pivotally attached to said frames upon opposite sides thereof, and reciprocally actuated members for operating the said flexing devices.

77. In a wire fabric machine, a support, a row of twisters mounted on said support, means for actuating said twisters, reciprocally carried rack-bars upon opposite sides of said support, and a series of pairs of wire flexing devices pivotally attached to the opposite sides of said support and in mesh with said rack-bars.

78. In a wire fabric machine, a support, a row of twisters mounted on said support, means for actuating said twisters, reciprocally carried rack-bars upon opposite sides of said support, and a series of pairs of wire flexing devices pivotally attached to the opposite sides of said support, the alternate flexing devices on the same side of the support being in mesh with their respective rack-bars.

79. In a wire fabric machine, a traveling support, a series of twisters on said support, means for operating said twisters, a series of wire flexing devices pivotally attached to said support and having toothed portions, rack-bars engaging the said flexing devices, and means at one end of said support and engaged by said rack-bars for moving said bars longitudinally in opposite directions.

80. In a wire fabric machine, a revoluble drum, twisters mounted in rows around the drum and also longitudinally of the drum, means for intermittingly rotating said longitudinal rows of twisters one at a time in succession, means for retaining the rows of twisters inoperative for a predetermined movement of said drum, wire flexing devices associated with said twisters and mounted on said drum, and means operating at predetermined intervals for actuating said flexing devices.

81. In a wire fence machine, a revoluble drum, twisters mounted on the surface of the drum and in rows around the drum and also longitudinally of the drum, and means for actuating the longitudinal rows of twisters one at a time in succession.

82. In a loom adapted to produce wire fabric from a plurality of continuously moving wires fed longitudinally in the same general direction, a support, wire flexing means movable with the wires in the direction of the feed thereof and serving to bring the wires together at intervals, and means for connecting the wires at their points of contact.

83. In a loom adapted to produce wire fabric from a plurality of continuously moving wires fed longitudinally in the same general direction, a support, wire flexing means movable with the wires in the direction of the feed thereof, and serving to bring the wire together at intervals, and twisters for twisting the wires together at their points of contact.

84. In a loom adapted to produce wire fabric from a plurality of continuously moving wires fed longitudinally in the same general direction, a support, and mechanism carried by the support and movable with the wires in the direction of the feed thereof to flex certain or all of said wires laterally and to twist said wires together to form meshes.

85. In a loom adapted to produce wire fabric from a plurality of continuously moving wires fed longitudinally in the same general direction, a support, wire flexing means movable with the wires in the direction of the feed thereof, and separate means also movable with the wires in the direction of the feed thereof to connect the wires and thus produce the fabric.

86. In a loom adapted to produce wire fabric from a plurality of continuously moving wires fed longitudinally in the same general direction, a support, wire flexing means movable with the wires in the direction of the feed thereof and serving to bring the wires together at intervals, and twisters also movable with the wires in the direction of their feed and operating during such movement to twist the wires together at their points of contact.

87. In a machine for making wire fabric, the combination with means for continuously advancing margin wires, intermediate line wires and mesh-forming wires longitudinally in the same general direction and in unison, of mechanism movable with the wires in the direction of the feed thereof and operating during such movement to deflect the mesh-forming wires in opposite directions at different points to produce the meshes and to connect deflected portions of the mesh-forming wires with each other, with the intermediate line wires and with the marginal wires, respectively.

88. In a loom adapted to produce wire fabric from a plurality of continuously moving wires fed longitudinally in the same general direction, a support, twisters mounted on the support and movable with the wires in the direction of the feed thereof, and wire-flexing means also movable with the wires to cause the same to contact at intervals to facilitate their connection at such points by the twisters.

89. In a loom for producing wire fabric from a plurality of continuously moving wires fed longitudinally in the same general direction, a support movable with the wires, and means mounted on the support and moving therewith to bring the wires together at intervals to form meshes and to twist the wires together at their points of contact.

90. In a machine for making wire fabric, the combination with a plurality of wire connecting devices in staggered arrangement, of means for moving a wire laterally to present it in the plane of said devices, and means for deflecting said wire to cause different portions thereof, to be engaged by the staggered devices.

91. In a machine for making wire fabric, the combination with sets of twisters, the twisters of adjacent sets having alternating arrangement, of wire guiding means for leading certain wires to twisters of alternate sets only and for leading certain other wires each to a twister of each set.

92. In a machine for making wire fabric, the combination with a series of sets of twisters mounted to travel in unison, the twisters of adjacent sets being in alternating arrangement and the twisters of alternate sets in line, of means for advancing a series of wires with the twisters, guiding means for directing certain of the wires to alined twisters only, and guiding and deflecting means for directing certain other of the wires to successive twisters arranged out of alinement.

93. In a machine for making wire fabric, the combination with a series of sets of twisters mounted to travel in unison, the twisters of adjacent sets being in alternating arrangement and the twisters of alternate sets in line, of means for advancing a series of wires with the twisters, guiding means for directing certain of the wires to alined twisters only, guiding and deflecting means for directing certain other of the wires to successive twisters arranged out of alinement, and means for operating the twisters to intertwist the wires in transit.

94. In a machine for making wire fabric, the combination with a series of sets of twisters mounted to travel in unison, the twisters of adjacent sets being in alternating arrangement and the twisters of alternate sets in line, of means for advancing a series of wires with the twisters, guiding means for directing certain of the wires to alined twisters only, guiding and deflecting means for directing certain other of the wires to successive twisters arranged out of alinement, and means for operating the twisters of each set in unison to connect the wires in transit.

95. In a machine for making wire fabric, the combination with a traveling twister, of means for advancing a plurality of wires with the twister, and means for positively urging the moving wires into the twister to be connected thereby.

In testimony whereof we affix our signatures, in presence of two witnesses.

BRADEN L. ELWELL.
WILLIAM GRIMM.
WILLIAM F. DREXLER, Jr.

Witnesses:
 JOSEPH HAUTE, Jr.,
 JOHN WITTMER.